United States Patent
Gammel et al.

(10) Patent No.: US 11,086,796 B2
(45) Date of Patent: Aug. 10, 2021

(54) ADDRESS-CODED ACCESS TOWARDS MEMORY

(71) Applicant: Infineon Technologies AG, Neubiberg (DE)

(72) Inventors: Berndt Gammel, Markt Schwaben (DE); Gerd Dirscherl, Munich (DE); Bernd Meyer, Munich (DE); Steffen Sonnekalb, Munich (DE)

(73) Assignee: Infineon Technologies AG, Neubiberg (DE)

( * ) Notice: Subject to any disclaimer, the term of this patent is extended or adjusted under 35 U.S.C. 154(b) by 31 days.

(21) Appl. No.: 16/422,911

(22) Filed: May 24, 2019

(65) Prior Publication Data
US 2019/0370190 A1 Dec. 5, 2019

(30) Foreign Application Priority Data

May 29, 2018 (DE) .......................... 102018112816.9

(51) Int. Cl.
*G06F 12/14* (2006.01)
*G06F 21/56* (2013.01)

(52) U.S. Cl.
CPC ........ *G06F 12/1425* (2013.01); *G06F 21/566* (2013.01); *G06F 2212/1052* (2013.01); *G06F 2221/034* (2013.01)

(58) Field of Classification Search
CPC .... G06F 12/1425; G06F 21/566; G06F 21/85; G06F 21/71; G06F 21/78; G06F 2221/1052; G06F 3/062
See application file for complete search history.

(56) References Cited

U.S. PATENT DOCUMENTS

| 4,464,746 | A | * | 8/1984 | Snijders | H04B 3/231 370/286 |
|---|---|---|---|---|---|
| 4,602,275 | A | * | 7/1986 | Smith | H04N 5/907 348/450 |
| 2006/0018165 | A1 | * | 1/2006 | Szczypinski | G11C 7/109 365/189.05 |
| 2009/0235113 | A1 | | 9/2009 | Shaeffer et al. | |
| 2011/0246857 | A1 | | 10/2011 | Bae et al. | |
| 2015/0378630 | A1 | | 12/2015 | Xi | |
| 2017/0339145 | A1 | * | 11/2017 | Serebrin | G06F 12/1475 |

OTHER PUBLICATIONS

Schneider, Hans-Jochen, "Lexikon Informatik und Datenverarbeitung", R. Oldenbourg Verlag, Munich, Wien. 1998, pp. 151-155. (Relevance: technical definition of term "code.").

* cited by examiner

*Primary Examiner* — Hiep T Nguyen
(74) *Attorney, Agent, or Firm* — Murphy, Bilak & Homiller, PLLC

(57) ABSTRACT

A method is provided for accessing a memory via at least one address, wherein the at least one address comprises a codeword of a code. Corresponding devices are also described.

17 Claims, 4 Drawing Sheets

ADDRESS-CODED ACCESS TOWARDS MEMORY

TECHNICAL FIELD

Embodiments of the present invention relate to reducing the chances of a successful attack on address lines in digital circuits.

BACKGROUND

In security applications, microcontrollers and application-specific integrated circuits (ASICS) are used, which may preferably be protected against attacks that involve physical manipulations, so-called physical attacks. Physical attacks allow manipulating a single or several logical values. A physical attack may be based on a static manipulation, for example, such as by cutting a wire or damaging a switching element (e.g., a transistor), so that a logical value (a bit and/or a signal) is permanently modified.

There are also various dynamic physical attacks: For example, a signal may be forced to a certain value or it may be flipped to its opposite logical value for a short period of time. Such dynamic physical attack allows an attacker to temporarily inject faults during a computation. This could be achieved, e.g., by laser fault injection (LFI) or by placing probing needles on a signal line and thereby applying a predetermined electrical potential to this signal line. These manipulations are reversible, and the attacker can mount multiple fault injections to analyze the behavior of a logic circuit, potentially retrieving a secret value due to temporary malfunction of the circuit.

Prominent targets of attack may be signal lines carrying addresses that are used to access certain peripheral interface registers or memory locations. An address manipulation may thus reveal a secret value, if a secret is read from or written to a manipulated address, i.e., an address that is not the intended target address, but a wrong address within the same device or of another peripheral device (i.e., a memory location).

SUMMARY

An objective of embodiments of the present invention is to provide an improved approach to reduce the chances of a successful attack on addresses that are used for accessing a memory. This objective may be achieved with embodiments having the features of the independent claims. Further embodiments result from the depending claims.

The examples suggested herein may in particular be based on at least one of the following solutions. Combinations of the following features may be utilized to reach a desired result. The features of the method may be combined with any feature(s) of the device, apparatus or system or vice versa.

A method is described for accessing a memory via at least one address, where the at least one address comprises a codeword of a code. The memory may be a memory space or a memory domain, and may in particular be a secure memory. The access towards the memory may be conducted via the codeword being the address. The address may be redirected by an address decoder. The access may comprise a write operation, a read operation or a verify operation.

In various embodiments, the address is a codeword of the code. The code may be an error detection and/or error correction code. Hence, it can be ensured that the access is only successful if the address is a codeword of the code.

The valid address space may thus be limited to codewords of the code. If the access is directed to an address that is not a codeword, this access can be denied and/or a predetermined action can be triggered. This allows detecting attacks that are directed to single bits of an address, for example.

According to some embodiments, a command that is associated with one address is obtained, and it is checked whether the address is a codeword. If the address is a codeword of the code, the command is executed. If the address is not a codeword of the code, a predetermined action is triggered.

The predetermined action may comprise a notification of an attempt to access an invalid address. The access may be blocked or it may be diverted to a predetermined address. The predetermined action may trigger a higher-level action that indicates an attempt to compromise the system. It may comprise an alarm notification or it may have an impact on the overall system, such as putting a halt to an operation to avoid further attempts to compromise the system to be successful.

The command may comprise a read operation, a write operation, a verify operation, a re-read operation (repeated read-operation) or the like. According to an embodiment, the command is obtained and checked by an address decoder.

According to some embodiments, the at least one address comprises a set of at least two addresses, wherein the set of at least two addresses comprises an original address and at least one redundancy address. In these embodiments, the original address and the at least one redundancy address are codewords of the code. An original command is directed to the original address and at least one additional command is directed to the at least one redundancy address. Data obtained from the original command and/or from the at least one additional command are compared to determine whether there was an unwanted change of any of the addresses.

According to some embodiments, the original address and the at least one redundancy address are directed to the same physical value that is stored in the memory or they are directed to different physical values that correspond to the same address or wherein at least one of the physical values referenced by the at least one redundancy address is inverted.

Hence, a common value (data) may be referenced via the original address as well as via the at least one redundancy address. It is an option, however, that at least one of the redundancy values is (at least partially of fully) inverted.

According to some embodiments, the comparison of data may be one of the following: comparing data read from the original address with data read from the at least one redundancy address; and comparing data that is to be written to the original address with data read from the at least one redundancy address or vice versa.

According to an embodiment, the comparison of data may provide the following results: if the data read from the original address or written to the original address differs from the data read from the redundancy address, a predetermined action is triggered; and if the data read from the original address or written to the original address does not differ from the data read from the redundancy address, no address manipulation is detected.

It is noted that "differ from" in this regard means that the comparison indicates an unexpected difference. Such unexpected difference triggers the predetermined action. However, an expected difference may stem from first data and second data, wherein one of those data is inverted: If, for example, a comparison between first data and second data is conducted, wherein the second data is an inversion of the first data, the comparison will nevertheless (because of the pre-defined inversion) indicate that the first data does not differ from the second data, because the inversion is on purpose and can be inherently compensated (e.g., by inverting the bits prior to conducting the actual comparison).

According to various embodiments, the command is a read command, a write command or a verify command.

According to some embodiments, the memory comprises a first memory space and a second memory space, where a portion of the first memory space is accessible by several addresses and a portion of the second memory space is accessible by several addresses. A combination of the several addresses for the portion of the first memory space and a combination of the several addresses for any portion of the second memory space are codewords of the code.

The first memory space and the second memory space may be memory spaces of different security domains. In particular, one of the memory spaces may be more secure than the other.

It is also an option that more than two memory spaces are utilized. In this case, the techniques described herein may be applied between the first memory space and each other memory space.

The portion of the (first or second) memory space may be a register. The register may be addressable via at least two addresses, e.g., one original address and at least one redundancy address. It is an option that the several addresses are hard-coded towards one physical address or they may be mapped towards the physical address by, e.g., an address decoder.

The combination of the several addresses per register (or portion) may establish a codeword as are the combinations of the several addresses of any register of the other memory domains. Hence, the encoding ensures that there is no address tuple from the first memory space that can be changed by fault injection E with wt(E)≤d to an address tuple of the second memory space. In other words, an attacker needs more than d−1 bit manipulations to overcome the chosen code.

According to some embodiments, two addresses per portion of the first memory space as well as two addresses per portion of the second memory space are used, wherein the two addresses comprise an original address and a redundancy address. In these embodiments, the code has a code distance d amounting to at least two. At least one of the first memory space and the second memory space are used as follows: the original addresses are arranged in a first address space and the redundancy addresses are arranged in a second address space.

According to some embodiments, the first address space and the second address space do not overlap. According to some embodiments, the first address space uses increasing addresses and the second address space uses decreasing addresses or vice versa. An increasing address refers to an address accessed via an increasing address counter and a decreasing address refers to an address accessed via a decreasing address counter. Hence different address spaces may be created by different ranges of values set by the address counter.

According to some embodiments, the memory comprises a continuous or a discontinuous memory space. According to some embodiments, the memory comprises at least one physical memory chip. The memory may be supplied by one or more physical memory chips. According to some embodiments, the memory comprises registers of a processor, an ASIC or a controller.

Also described herein is a device that is arranged for accessing a memory via at least one address, wherein the at least one address comprises a codeword of a code. The device may comprise a processing unit for conducting the steps as described herein. It is noted that the steps of the method stated herein may be executable on this device and/or this processing unit.

It is further noted that said processing unit can comprise at least one, in particular several means that are arranged to execute the steps of the method described herein. The means may be logically or physically separated; in particular several logically separate means could be combined in at least one physical unit. Said processing unit may comprise at least one of the following: a processor, a microcontroller, a hard-wired circuit, an ASIC, an FPGA, a logic device.

Further, an apparatus is described that comprises means for accessing a memory via at least one address, wherein the at least one address comprises a codeword of a code. A computer program product is provided, which is directly loadable into a memory of a digital processing device and comprises software code portions for performing the steps of the method as described herein. Also, a computer-readable medium is described, with the computer-readable medium having computer-executable instructions adapted to cause a computer system to perform steps of the method as described herein.

BRIEF DESCRIPTION OF THE FIGURES

Embodiments are shown and illustrated with reference to the drawings. The drawings serve to illustrate the basic principle, so that only aspects necessary for understanding the basic principle are illustrated. The drawings are not to scale. In the drawings the same reference characters denote like features.

DETAILED DESCRIPTION

Examples described herein in particular suggest using at least one address as a codeword.

The code may be an error detection and/or error correction code. This code comprises several codewords, which are defined by the code. The codewords have a predetermined distance from each other so that individual errors in the codeword can be detected and/or corrected.

A Hamming distance (see: https://en.wikipedia.org/wiki/Hamming_distance) is used to define some notions in coding theory, such as error detecting and error correcting codes. In particular, a code C is said to be k-errors detecting if any two codewords c1 and c2 from the code C that have a Hamming distance less than k coincide; otherwise, a code is k-errors detecting if the minimum Hamming distance between any two of its codewords is at least k+1.

For example, if the codewords of the code used for addresses have a distance amounting to 2, a single bit address manipulation in the address can be detected, e.g., by an address decoder.

Examples described herein provide a solution that does not require additional side-band signals. Also, these solutions can be used in combination with existing bus systems. The approach further provides protection against single bit manipulations on address lines and it provides protection against multiple bit manipulations.

Example: Using a Single Codeword as an Address

In an example, the address is a codeword. The codeword may be checked for validity by, e.g., an address decoder. If the codeword is valid, access towards the address is conducted, i.e., a command associated with the address is executed. If the codeword is invalid, on the other hand, the address decoder may initiate a predetermined action, e.g., issue an alarm or any predefined notification. Hence, an attempted access towards a manipulated address, which is not a valid codeword, is noticed and can be avoided or redirected.

Figure 1:
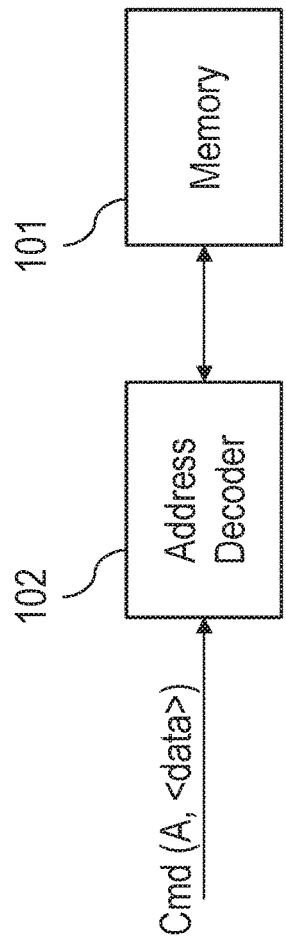
FIG. 1 shows an exemplary diagram visualizing that an address A is used to access a memory via an address decoder.

FIG. 1 shows an exemplary diagram visualizing that an address A is used to access a memory 101 via an address decoder 102. A command Cmd is used to conduct an operation, e.g., a read operation, a write operation, an erase operation, a verify operation or the like utilizing the address A. Optionally, the command Cmd may use data for conducting the operation; this option is indicated by square brackets. For example, if the command Cmd is a write operation, data is to be written (stored) at the address A. If the command Cmd is a read operation, only the address A may be used as an operand to read data at this address.

The command Cmd is received at the address decoder 102, which determines whether the address A is a codeword of a predetermined code. If the address A is a codeword, the address A is considered valid and access to the memory at the address A is granted.

If the address A is not a codeword, the address A is considered invalid and a predetermined action is triggered. This predetermined action may comprise a notification of an attempt to access an invalid address. The access may be blocked, or it may be diverted to a predetermined address. The predetermined action may trigger a higher-level action that indicates an attempt to compromise the system.

Figure 2:
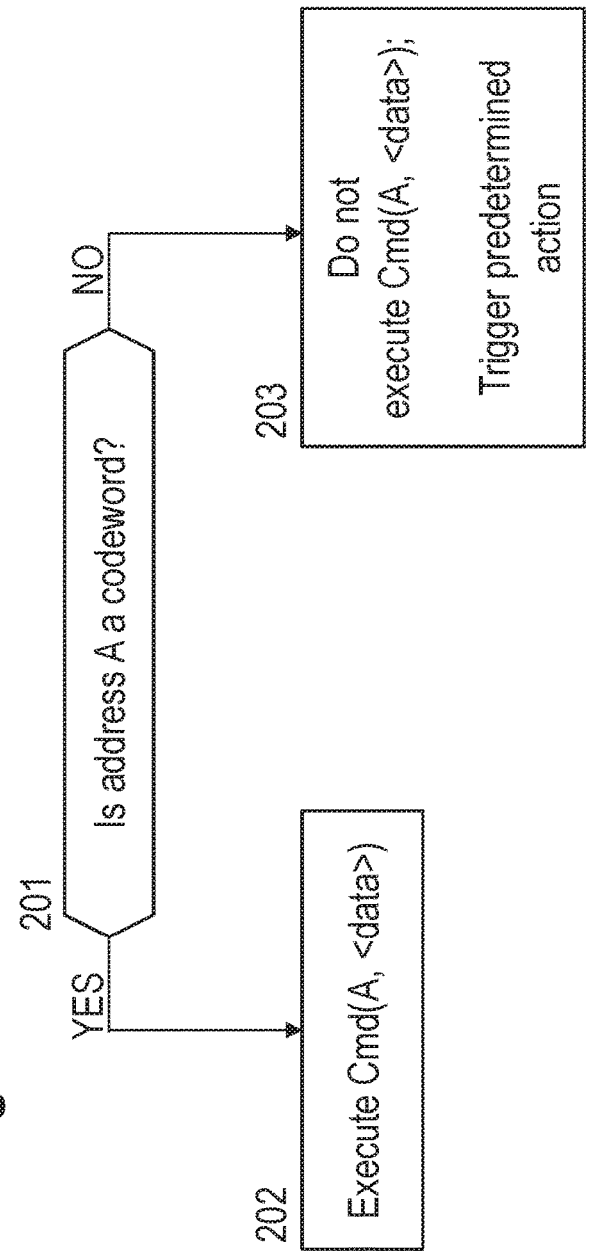
FIG. 2 shows a schematic flow chart with steps to determine whether an access to the memory is considered valid or not.

FIG. 2 shows a schematic flow chart with steps to determine whether an access to the memory is considered valid or not. The steps shown in FIG. 2 may be executed by the address decoder 102 as exemplarily shown in FIG. 1.

In a step 201 it is checked whether the address A in the command Cmd(A, <data>) is a codeword. If this is the case, it is branched to a step 202 and the command Cmd is executed, i.e., the access to the memory 101 is granted.

If the condition of step 201 is not fulfilled, it is branched to a step 203 and the command Cmd is not executed; a predetermined action (e.g., an alarm notification) as described above may be triggered instead.

Hence, the solution shown in FIG. 1 and FIG. 2 only allows access to addresses which are codewords of a predetermined code. The access may comprise, e.g., a read, write, erase or validation access.

It is noted that the address decoder is an exemplary entity that can be used for checking whether the address is valid, i.e. whether the address is a codeword. Any entity that is suitable for accessing the actual memory can be used for this purpose as well.

Example: Connecting Stored Information to at Least Two Addresses

In an exemplary scenario, two or more addresses are provided for the same peripheral interface register and a data value may be transmitted two (or more) times: one time using a first address (i.e., an "original address" A) and a second time using another address (i.e. a "redundancy address" A*).

It is noted that the term "original address" refers to a first address and the term "redundancy address" refers to at least one additional (i.e. second, third, etc.) address. Hence, there may be at least two addresses A and A* that refer to one actual portion of a memory, e.g., a register or a processor.

A comparison of the data received via the different addresses A and A* may then be used to determine whether an address manipulation has occurred.

It is noted that the same data registers can be connected to the original address as well as to the redundancy address. In this scenario, there may be one actual physical register comprising data, which is accessed via two different addresses. It is also an option that two different places in the memory are used for the addresses A and A*, whereas the data stored in these different places may be the same. As an option, one data may be (stored and/or accessed) inverted with respect to the other data.

Figure 3:
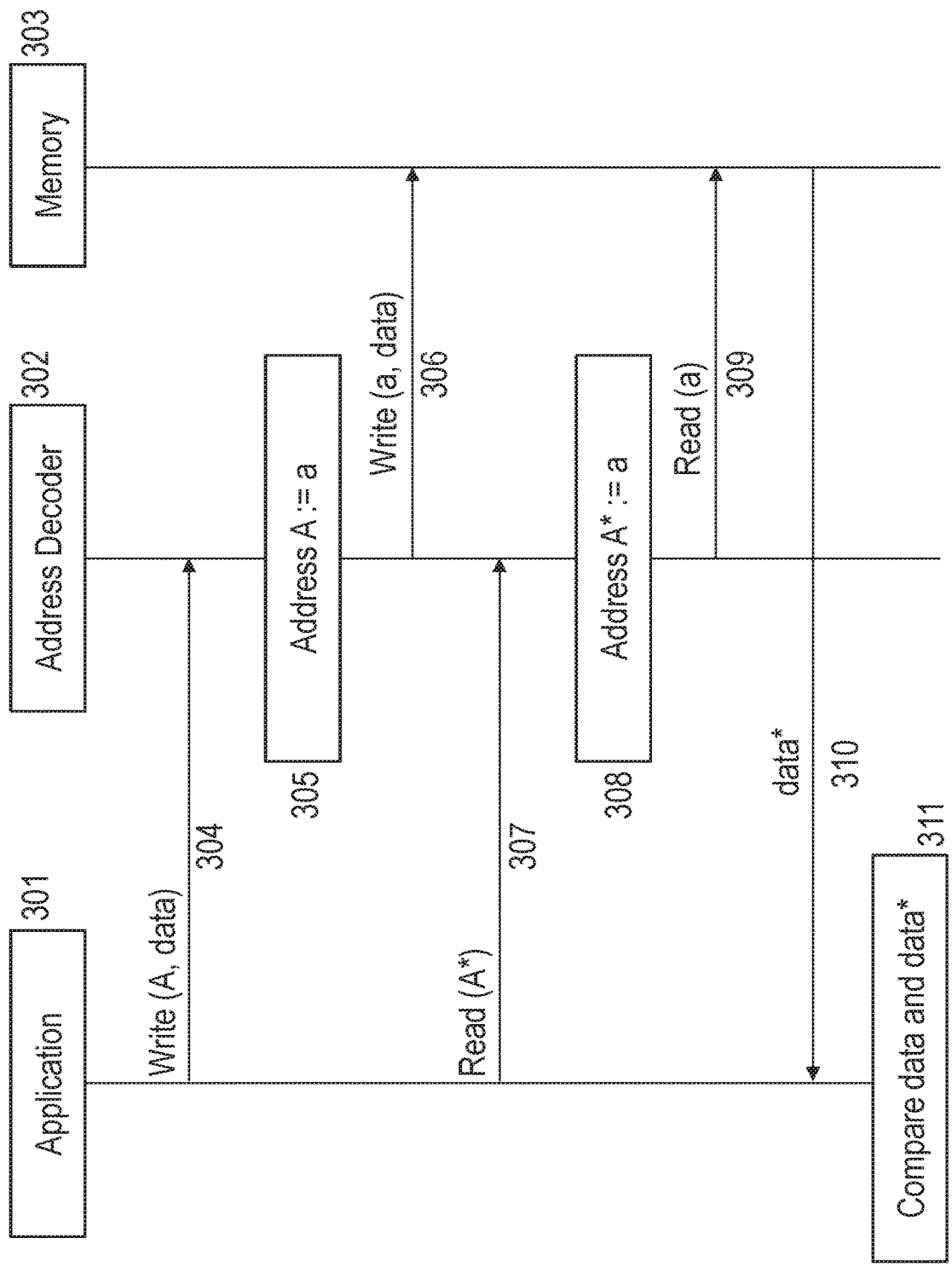
FIG. 3 shows an exemplary message sequence chart visualizing a communication between an application, an address decoder and a memory.

FIG. 3 shows an exemplary message sequence chart visualizing a communication between an application 301, an address decoder 302 and a memory 303. The application 301 may be any functionality that utilizes access towards the memory 303. The functionality of the address decoder 302 described herein is optional as will be shown later with regard, e.g., to FIG. 5.

The exemplary scenario depicted in FIG. 3 shows that an information "data" is written to the memory 303 and it is then checked by a subsequent read operation whether the write operation was successful.

Hence, the application 301 in a step 304 issues a write command

Write (A, data)

towards the address decoder 302 thereby indicating an address A and an information "data" to be written. The address decoder 302 in a step 305 maps the address A to an actual address a and initiates the actual write command 306

Write (a, data)

towards the physical address a of the memory 303. It is noted that the address A and the mapped address a may be the same.

It is noted that the memory 303 may be a physical register of a controller or processor or it may be any sort of continuous or discontinuous memory (space).

The application in a step 307 then issues a read command

Read (A*), which is directed to the redundancy address A*. In this example, the address decoder 302 in a step 308 maps the redundancy address A* to the physical address a and triggers a read command 309 towards this address a:

Read (a).

In a step 310, the information data* read in step 309 is conveyed towards the application 301. In a step 311 the application 301 compares data and data*. If both are identical, there is a high likelihood that the write operation was successful. If both are not identical, the write operation could have been defective, and/or an address manipulation may have been directed to the commands conveyed in either step 304 or step 307.

The combination of the addresses A and A* may in particular be a codeword of a predetermined code, i.e. (A, A*)→CW. It is also an option that each of the addresses A and A* are a codeword of the predetermined code.

If an attack towards the address A is successful, which would result in a different address B, the address decoder 302 would not use the actual address a, but another address b to access the memory 303. The read operation 307 (if not attacked) would then return the information data*, which is different from data, because the write operation to the address A was not successful.

If the write operation 304, 306 was successful and the address used in the read operation 307 is redirected to an address B, the information data* is different from the information data written to the address A. Hence, attacks towards the operations 304 or 307 could be recognized by the application 301.

If the codewords of this code have a hamming distance amounting to two, a manipulation of a single bit within the codeword would not lead to another codeword, hence it would not reveal a valid information to the attacker.

Figure 4:
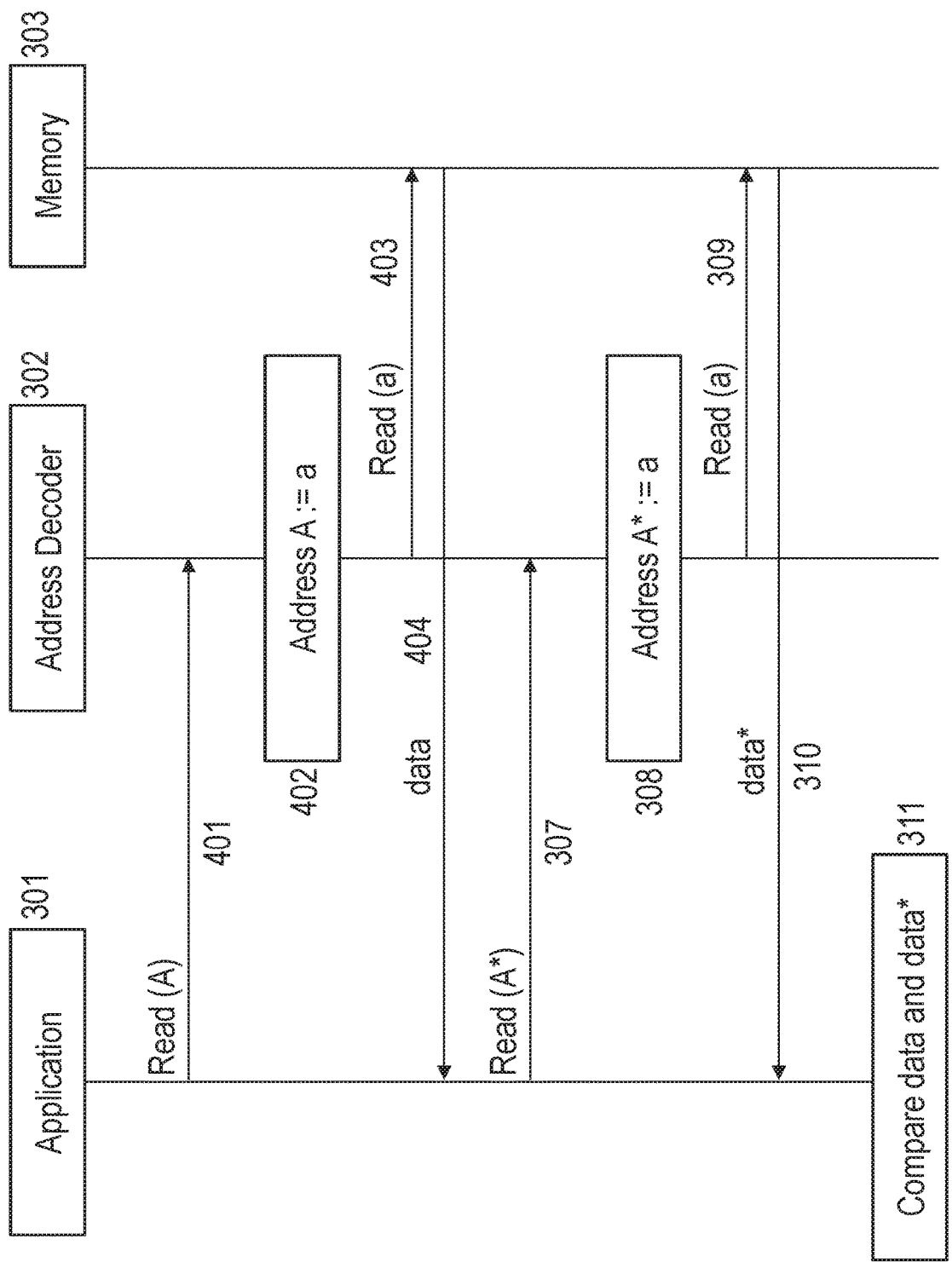
FIG. 4 shows a similar concept to the one shown in FIG. 3, except that the write operation is substituted by another read operation.

FIG. 4 shows a similar concept, except that the write operation in step 304 is substituted by another read operation in a step 401. The application in the step 401 issues a read command Read (A), which is directed to the original address A. In this example, the address decoder 302 in a step 402 maps the address A to the physical address a and triggers a read command 403 towards this address a:

Read (a).

In a step 404, the information data read in step 403 is conveyed towards the application 301.

Then, the steps 307 to 311 are executed as described with regard to FIG. 3 above.

Hence, a read operation is divided into two read operation, each using a different address, first the address A, then the address A*. Any manipulation of any of the addresses A or A* in the steps 401 or 307 may lead to a different physical address a, which would then reveal that the information received in steps 404 and 310 are different. Thus, manipulations directed to the addresses of the commands used in steps 401 and 307 can be recognized by the application.

Figure 5:
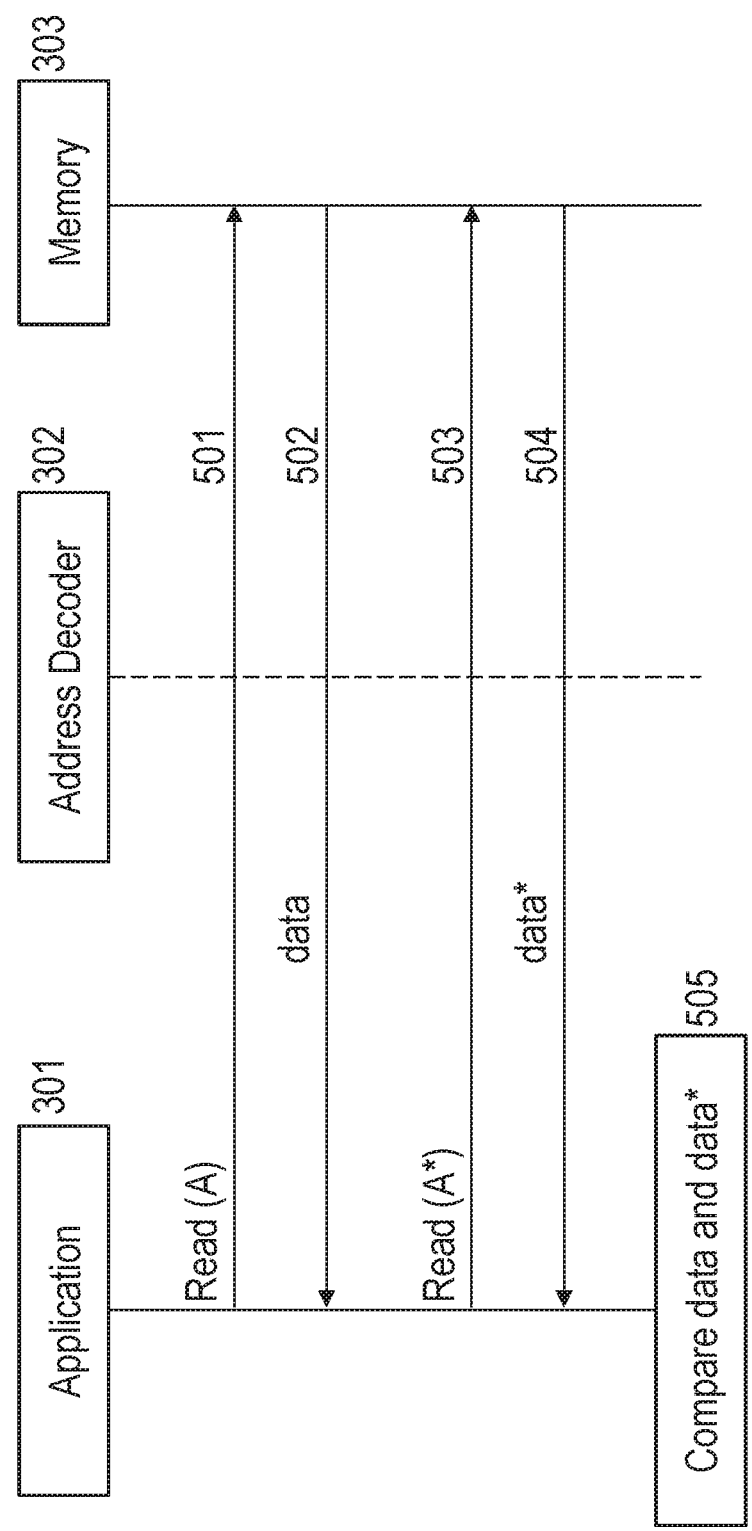
FIG. 5 shows a message sequence chart of an alternative embodiment without utilizing an addition re-mapping at the address decoder shown in FIG. 4.

FIG. 5 shows a message sequence chart of an alternative embodiment without utilizing an addition re-mapping at the address decoder 302.

A read command (step 501)

Read (A)

is directed to an address A of the memory 303 and returns an information data stored at this address A (step 502).

Then, a read command (step 503)

Read (A*)

is directed to an address A* of the memory 303 and returns an information data* stored at this address A* (step 504).

If it has been ensured that the addresses A and A* carry the same information, a comparison in a step 309 may indicate that the read accesses in both steps 501 and 503 have been successful, because data and data* are identical. Otherwise, a manipulation of either address A or address A* may have occurred.

These examples show that, e.g., the application 301 (or any other functionality) may ensure that the memory 303 is used in a fault-tolerant manner: Each information data may be written to a set of addresses A and A*, wherein each of the addresses A and A* may be codewords of a predetermined code.

Example: Using Several Addresses with a Single Codeword

In order to avoid that a single bit manipulation shifts both addresses (A and A*) to another peripheral's address range, the following approach may be utilized.

It is noted that a peripheral may be any entity, e.g., controller, processor, register (set), memory, which define a particular secure domain. It is often required that an address space of a first domain does not interfere with an address space of another domain, in particular if the first domain is a secure domain. In such example, it may be considered less harmful if a command directed to a particular address of a secure domain is redirected to another address of this secure domain. However, it is considered problematic if an access towards a less secure address space is directed towards a secure address space, which may then return information from this secure address space (which, of course, should be prevented).

Logical registers R1, R2, . . . may be provided at original addresses A1, A2, . . . , wherein each of the original addresses may have at least one redundancy address A1*, A2*, etc.

The logical registers may be registers of a peripheral, e.g., processor, controller or the like. The logical registers may also be parts of any physical memory.

As an option, more than one redundancy address may be provided for each original address (i.e. for each register); hence, the original address A1 may be associated with redundancy addresses A1*, A1**, etc. The following examples, however, assume a pair of addresses, i.e. one original address and one redundancy address for each of the registers, i.e.:

R1: A1, A1*;
R2: A2, A2*;
R3: A3, A3*;
R4: A4, A4*.

The registers R1 to R4 may be grouped into groups GA, GB. Each group comprises registers of a particular memory domain, e.g., of a particular peripheral such as a processor.

In the example provided herein, at least one of the groups GA and GB may be associated with registers of a secure processor.

It is an object of an attack that multiple address line manipulations move an original address A and its corresponding redundancy address A* to an address of a register that belongs to another group.

For example
the group GA comprises the registers
R1: A1, A1* and
R2: A2, A2*,
the group GB comprises the registers
R3: A3, A3* and
R4: A4, A4*.

A difference vector E indicates a malicious address manipulation such that an address Ai is changed to a faulty address Ai', i.e., Ai'=Ai+E, wherein the difference vector E has a weight wt amounting to wt(E)≤d, wherein d denotes the Hamming weight of the difference vector E, which corresponds to a maximum number of single bit faults (needs, LFI spots) the attacker is able to inject to overcome the countermeasure.

It is noted that "+" refers to a bitwise addition modulo 2, i.e. an exclusive-OR (also referred to as EXOR) operation.

An address encoding scheme is used such that the following conditions apply:

A1+E≠A3 and A1*+E≠A3*,
A1+E≠A4 and A1*+E≠A4*,
A2+E≠A3 and A2*+E≠A3*, and
A2+E≠A4 and A2*+E≠A4*.

Hence, the encoding ensures that there is no address pair from the group GA that can be changed by a fault injection E with wt(E)≤d to an address pair of the group GB.

Hence, the address pairs (A1, A1*), (A3, A3*), (A4, A4*) are codewords of a predetermined code. Accordingly, the address pairs (A2, A2*), (A3, A3*), (A4, A4*) are codewords of this code.

A suitable or preferable code can be selected such that the attacker has to force one bit line to 0 and another bit line to 1 simultaneously, which in some physical attack scenarios may be more difficult than forcing two bit lines to either 0 or 1.

In such a solution, no additional hardware for parity bits is required and the security level can be adjusted to match the fault model describing the attacker.

This example thus comprises a combination of
registers that are accessible via multiple addresses,
a grouping of registers, and
a selection of an address encoding scheme such that an attacker needs more than d−1 bit manipulations to overcome the chosen code.

According to the example above, the four registers R1 to R4 are arranged into the two groups GA and GA as follows:
GA (R1, R2) and
GB (R3, R4).

An exemplary code is used with an exemplary distance amounting to d=3.

As an additional requirement, two faults should also have alternating polarity. This can be expressed as follows (addresses are noted as binary strings):

The group GA comprises
the register R1 with
the original address A1=0000, and
the redundant address A1*=0001,
the register R2 with
the original address A2=0010, and
the redundant address A2*=0011,
the group GB comprises
the register R3 with
the original address A3=1101, and
the redundant address A3*=1100,
the register R4 with
the original address A4=1111, and
the original address A4*=1110.

The register R1 is mapped to the register R4 by a difference vector E=1111 inducing four faults. In this case, the address A1 is mapped to the address A4 and the address A1* is mapped to the address A4* (the operation "+" indicates the EXOR-operation):

A1+E=0000+1111=1111=A4;
A1*+E=0001+1111=1110=A4*.

The register R1 is mapped to the register R3 by a difference vector E=1101 inducing three faults. Here, the address A1 is mapped to the address A3 and the address A1* is mapped to the address A3*:

A1+E=0000+1101=1101=A3;
A1*+E=0001+1101=1100=A3*.

The register R2 is mapped to the register R3 by the difference vector E=1111 inducing four faults. In this case, the address A2 is mapped to the address A3 and the address A2* is mapped to the address A3*:

A2+E=0010+1111=1101=A3;
A2*+E=0011+1111=1100=A3*.

The register R2 is mapped to the register R4 by the difference vector E=1101 inducing three faults. Here, the address A2 is mapped to the address A4 and the address A2* is mapped to the address A4*:

A2+E=0010+1101=1111=A4;
A2*+E=0011+1101=1110=A4*.

Hence, according to this example, an attack requires at least the difference vector E=1101 that includes three bit faults. Therefore, the code distance in this example amounts to ti d=max wt(E)=3.

Any difference vector E using only two bit faults would not suffice to successfully redirect an address of the group GA to an address of the group GB.

In an exemplary embodiment, a code distance of d≥2 may be achieved by using increasing addresses for Ai and decreasing (in particular non-overlapping) addresses for Ai* for arbitrary numbers of registers in arbitrary numbers of groups.

In one or more examples, the functions described herein may be implemented at least partially in hardware, such as specific hardware components or a processor. More generally, the techniques may be implemented in hardware, processors, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium, i.e., a computer-readable transmission medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more central processing units (CPU), digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a single hardware unit or provided by a collection of interoperative hardware units, including one or more processors as described above, in conjunction with suitable software and/or firmware.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. It should be mentioned that features explained with reference to a specific figure may be combined with features of other figures, even in those cases in which this has not explicitly been mentioned. Further, the methods of the invention may be achieved in either all software implementations, using the appropriate processor instructions, or in hybrid implementations that utilize a combination of hardware logic and software logic to achieve the same results. Such modifications to the inventive concept are intended to be covered by the appended claims.

What is claimed is:

1. A method, comprising:
   accessing a memory via at least one address, wherein the at least one address comprises a codeword of a code, the code being an error-correcting code or an error-detecting code or both an error-correcting and error-detecting code.

2. The method of claim 1, comprising:
   obtaining a command that is associated with one address;
   checking whether the address comprises a codeword of the code; and
   executing the command if the address comprises a codeword of the code, and otherwise, if the address does not comprise a codeword of the code, triggering a predetermined action.

3. The method of claim 2, wherein the command is a read command, a write command or a verify command.

4. The method of claim 3, wherein the command is obtained and checked by an address decoder.

5. The method of claim 1, wherein the at least one address comprises a set of at least two addresses, wherein the set of at least two addresses comprises an original address and at least one redundancy address, and wherein the original address and the at least one redundancy address comprise codewords of the code, and wherein the method comprises:
   directing an original command to the original address and directing at least one additional command to the at least one redundancy address; and
   comparing data obtained from the original command to data obtained from the at least one additional command to determine whether there was an unwanted change of any of the addresses.

6. The method of claim 5, wherein the original address and the at least one redundancy address are directed to the same physical value that is stored in the memory or are directed to different physical values that correspond to the same address or wherein at least one of the physical values referenced by the at least one redundancy address is inverted.

7. The method of claim 5, wherein said comparing data comprises one of the following:
   comparing data read from the original address with data read from the at least one redundancy address; and
   comparing data that is to be written to the original address with data read from the at least one redundancy address or vice versa.

8. The method of claim 5, wherein the method further comprises:
   if the data read from the original address or written to the original address differs from the data read from the redundancy address, triggering a predetermined action, and otherwise, if the data read from the original address or written to the original address does not differ from the data read from the redundancy address, determining that no address manipulation is detected.

9. The method of claim 1, wherein the memory comprises a first memory space and a second memory space, wherein a portion of the first memory space is accessible by several addresses, wherein a portion of the second memory space is accessible by several addresses, and wherein a combination of the several addresses for the portion of the first memory space and a combination of the several addresses for any portion of the second memory space comprise codewords of the code.

10. The method of claim 9, wherein two addresses per portion of the first memory space as well as two addresses per portion of the second memory space are used, wherein the two addresses comprise an original address and a redundancy address, wherein the code has a code distance d amounting to at least two, and wherein at least one of the first memory space and the second memory space are used as follows: the original addresses are arranged in a first address space and the redundancy addresses are arranged in a second address space.

11. The method of claim 10, wherein the first address space and the second address space do not overlap.

12. The method of claim 10, wherein the first address space uses increasing addresses and the second address space uses decreasing addresses or vice versa.

13. The method of claim 1, wherein the memory comprises a continuous or a discontinuous memory space.

14. The method of claim 1, wherein the memory comprises at least one physical memory chip.

15. The method of claim 1, wherein the memory comprises registers of a processor, an ASIC or a controller.

16. A device, comprising:
a processing circuit configured to access a memory via at least one address, wherein the at least one address comprises a codeword of a code, the code being an error-correcting code or an error-detecting code or both an error-correcting and error-detecting code.

17. An apparatus, comprising:
a means for accessing a memory via at least one address, wherein the at least one address comprises a codeword of a code, the code being an error-correcting code or an error-detecting code or both an error-correcting and error-detecting code.

\* \* \* \* \*